US008774782B2

(12) United States Patent
Renou

(10) Patent No.: US 8,774,782 B2
(45) Date of Patent: Jul. 8, 2014

(54) MOBILE PHONE COMPRISING A STREAMING SERVER WITH A CONTROL MEANS FOR CONTROLLING THE CONVERSION OF A FILE BEFORE STREAMING THEREOF

(75) Inventor: Olivier Yves Marc Renou, Chambery (FR)

(73) Assignee: Myriad Group AG, Zurich (CH)

( * ) Notice: Subject to any disclaimer, the term of this patent is extended or adjusted under 35 U.S.C. 154(b) by 66 days.

(21) Appl. No.: 13/136,297

(22) Filed: Jul. 28, 2011

(65) Prior Publication Data
US 2012/0122438 A1 May 17, 2012

(30) Foreign Application Priority Data
Jul. 29, 2010 (FR) ...................... 10 56259

(51) Int. Cl.
*H04L 29/08* (2006.01)
(52) U.S. Cl.
USPC .................... 455/414.4; 455/432.2
(58) Field of Classification Search
CPC ............. H04L 65/607; H04L 65/608; H04L 29/08108; H04L 29/08756; H04N 19/00472; H04N 21/64707; H04N 7/26941; H04W 4/18; H04W 88/181
USPC .......................................... 455/414.4, 432.2
See application file for complete search history.

(56) References Cited

U.S. PATENT DOCUMENTS

| | | | | |
|---|---|---|---|---|
| 6,233,359 B1 * | 5/2001 | Ratnakar et al. | ............... | 382/250 |
| 7,567,810 B1 * | 7/2009 | Overton | ...................... | 455/456.3 |
| 2003/0187954 A1 * | 10/2003 | Wen et al. | ...................... | 709/219 |
| 2003/0200337 A1 * | 10/2003 | Jabri et al. | ..................... | 709/246 |
| 2007/0189708 A1 * | 8/2007 | Lerman et al. | .................. | 386/52 |
| 2007/0283048 A1 * | 12/2007 | Theimer et al. | ............... | 709/246 |

(Continued)

FOREIGN PATENT DOCUMENTS

JP 2009258916 11/2009
WO WO 2008/143493 A2 11/2008

OTHER PUBLICATIONS

Healey et al.:"CES Beam from the phone to the TV screen," LA Times, Jan. 9, 2010, pp. 1-2.

(Continued)

*Primary Examiner* — Liton Miah
(74) *Attorney, Agent, or Firm* — Davidson, Davidson & Kappel, LLC

(57) ABSTRACT

A mobile phone (12) includes a first buffer memory (32) for storing a data file, the data file being in a first format and including a plurality of data packets, a converter (34) for converting the file stored in the first buffer memory, from the first format into a second format, the converter (34) being connected as output of the first buffer memory (32), a second buffer memory (36) connected as output of the converter (34) and adapted to store the transformed file in the second format, and a streaming server (18) for streaming data to a remote client equipment (14) according to a predetermined network protocol. The streaming server (18) is adapted to be connected to the remote client equipment (14) via a data link (16) and to receive a data streaming request from the remote client equipment (14). The streaming server (18) includes a controller (44) for controlling the converter (34), the controller (44) being adapted to send the converter (34) a control signal for controlling the conversion of a respective data packet of the file.

7 Claims, 7 Drawing Sheets

(56) References Cited

U.S. PATENT DOCUMENTS

2009/0024806 A1*  1/2009  Bilger et al. .................. 711/154
2011/0055864 A1*  3/2011  Shah et al. ...................... 725/31
2011/0145581 A1*  6/2011  Malhotra et al. .............. 713/171

OTHER PUBLICATIONS

Jason:"Twonky Ii live transcoding," Qnap NAS Community Forum (Online) Jan. 13, 2010, 2 pages.
Alexander Grundner:"Smartphone Version of Twonky Media's DLNA/UPNP Server now available," e Home Upgrade, Jan. 7, 2010.
Anonymous:"Twonky Mobile Apps," Twonkey (Online), 2010, p. 2 pp.
Anonymous:"Twonkymedia goes mobile with android launch and ces," Twonky (Online), Jan. 7, 2010, p. 2pp.
Wimberly: "Twonkyserver Mobile: media server in your pocket," Twonky (Online), Jan. 8, 2010.
Anonymous:"Samsung Galaxy S GT-19000 quick start guide," Samsung (Online); Jul. 1, 2010, pp. 1 to 58.

* cited by examiner

MOBILE PHONE COMPRISING A STREAMING SERVER WITH A CONTROL MEANS FOR CONTROLLING THE CONVERSION OF A FILE BEFORE STREAMING THEREOF

This claims the benefit of French Patent Application FR 10 562 59, filed Jul. 29, 2010 and hereby incorporated by reference herein.

The present invention relates to a mobile phone of the type comprising:

a first buffer memory for storing a data file, the data file being in a first format and including a plurality of data packets, a conversion means for converting the file stored in the first buffer memory from the first format into a second format, the conversion means being connected as output of the first buffer memory, a second buffer memory connected as output of the conversion means and adapted to store the transformed file in the second format, a streaming server for streaming data to a remote client equipment according to a predetermined network protocol, the streaming server being adapted to be connected to the remote client equipment via a data link and to receive a data streaming request from the remote client equipment.

The invention also relates to a local data communication network including such a mobile phone and remote client equipment connected to the mobile phone via a data link, the mobile phone and the remote client equipment being adapted to communicate using a predetermined network protocol.

BACKGROUND

A mobile phone of the aforementioned type is known. The mobile phone includes a streaming server generally compatible with the UPnP (Universal Plug and Play) network protocol, or respectively with the DLNA (Digital Living Network Alliance) interoperability standard, the server then being called a UPnP server or DLNA server, respectively. Such a server makes it possible to stream media saved in an internal memory of the phone to a remote client equipment also compatible with the UPnP network protocol, or with the DLNA standard. The streamed media includes audio and/or video data. The mobile phone also includes a means for converting the file stored in the internal memory, such as a transcoding application when the format of the media saved in the memory, and intended to be streamed toward the remote client equipment, is not compatible with the formats supported by the remote client equipment.

SUMMARY OF THE INVENTION

However, the streaming of a file whereof the format is not supported by the remote client equipment is relatively complex for the user to implement on such a mobile phone, in particular operating under an Android-type operating system. The user must begin by executing the transcoding application, so as to transcode the file to be streamed from its initial format to a format supported by the remote client equipment. This operation in particular requires the user to select the file to be transcoded, choose the adapted output format, and indicate a location of the internal memory for storing the transcoded file. The user must then select, using a UPnP or DLNA controller, respectively, the transcoded file for streaming thereof by the streaming server.

It is an object of the present invention to provide a mobile phone comprising a streaming server and a conversion means for converting a file from a first format to a second format, making it possible to facilitate the streaming of a file whereof the format is not supported by the remote client equipment.

The present invention provides a mobile phone of the aforementioned type, wherein the streaming server includes a control means or controller for controlling the conversion means or converter, the control means being adapted to send the conversion means a control signal for controlling the conversion of a respective data packet of the file.

According to other embodiments, the mobile phone comprises one or more of the following features, considered alone or according to all technically possible combinations:

the streaming server is adapted to send the remote client equipment at least one data packet converted and stored in the second buffer memory, even if all of the data packets of the file are not converted;

the streaming server is adapted to simultaneously send a plurality of converted data packets to the remote client equipment;

the conversion means comprises an audio and/or video transcoding means or transcoder, the first and second formats including audio and/or video attributes, and said audio and/or video attributes of the second format being different from those of the first format;

the conversion means comprises a decrypting means or decrypter, the first format corresponding to the encrypted data;

the conversion means comprises an encrypting means or encrypter, the second format corresponding to encrypted data;

the mobile phone also comprises a downloading means or downloader for downloading data from a web server, the file including a plurality of data blocks, the downloading means being adapted to download, block by block, the data file in the first buffer memory, and the control means being adapted to send the control signals to the conversion means, even if all of the blocks of the file are not downloaded.

The invention also relates to a local data communication network of the aforementioned type, wherein the mobile phone is as defined above.

The invention also relates to a method implemented by a mobile phone comprising a first buffer memory, a conversion means for converting data from a first format to a second format, the conversion means being connected as output to the first buffer memory, a second buffer memory connected as output of the conversion means, and a streaming server that is adapted to be connected to remote client equipment via a data link and is adapted to receive, from the remote client equipment, a data streaming request, the method comprising:

storing a data file in the first buffer memory, the data file being in a first format and including a plurality of data packets, the transmission by the streaming server of a control signal to the conversion means, the conversion by the conversion means of a respective packet of the file, upon receipt of said control signal, and storing the respective converted data packet in the second buffer memory.

The invention also relates to a computer program product including instructions that, when implemented by a computer incorporated into a mobile phone, implements the method as defined above.

BRIEF DESCRIPTION OF THE DRAWINGS

These features and advantages of the invention will appear upon reading the following description, provided solely as an example, and done in reference to the appended drawings, in which.

DETAILED DESCRIPTION

The invention is in particular applicable to a mobile phone using the Android® operating system by Google. Alternatively, the invention applies to a mobile phone operating under any operating system of the same type as the Android® operating system.

Figure 1:
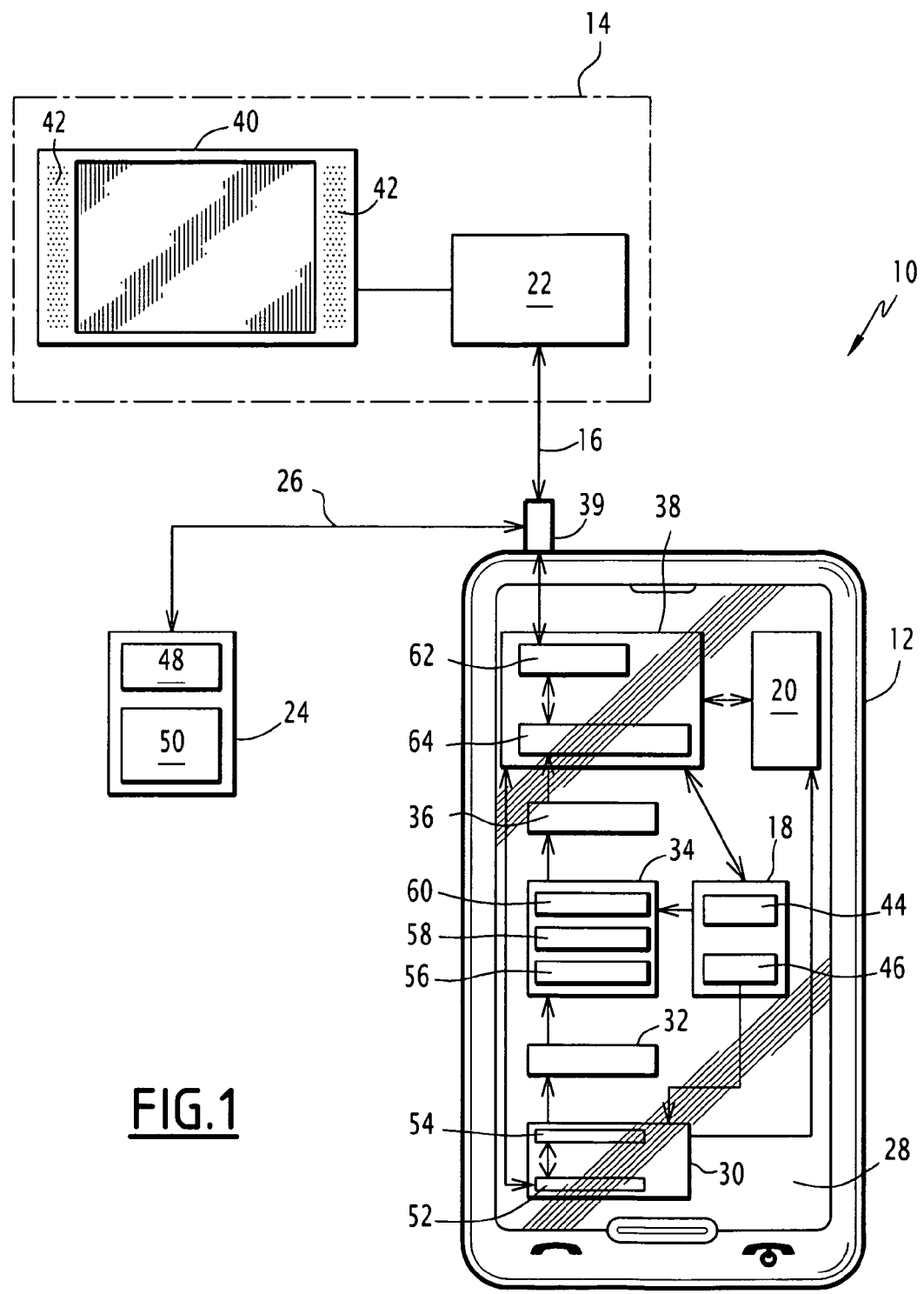
FIG. 1 is a diagrammatic illustration of a local data communication network including a mobile phone according to the invention.

In FIG. 1, a local data communication network 10 comprises a mobile phone 12 and remote client equipment 14 connected to the mobile phone via a first radio link 16. The mobile phone 12 and the remote client equipment 14 are adapted to communicate according to a predetermined network protocol.

The predetermined network protocol is in compliance with standard ISO/IEC 29341, and is also called UPnP network protocol (Universal Plug and Play).

Complementarily, the predetermined network protocol is also in compliance with the DLNA (Digital Living Network Alliance) interoperability standard.

According to the UPnP standard or the DLNA standard, the local communication network 10 includes a streaming server 18, also called media server, a remote control device 20, and a client device 22, also called renderer.

When the predetermined network protocol is a UPnP protocol, the streaming server 18, the control device 20 and the renderer 22 are respectively called UPnP server, UPnP controller and UPnP client.

When the predetermined network protocol is also in compliance with the DLNA standard, the streaming server 18, the control device 20 and the client device 22 are respectively called DLNA server, DLNA controller and DLNA client.

In the embodiment of FIG. 1, the mobile phone 12, shown in the form of functional modules, includes the streaming server 18 and the control device 20. The remote client equipment 14 includes the client device 22.

Alternatively, the mobile phone includes the streaming server, but does not include the control device, an independent electronic apparatus comprising said control device. The remote client equipment includes the client device.

Alternatively, the mobile phone includes the streaming server, but does not include the control device, the remote client equipment comprising both the control device and the client device.

The mobile phone 12 is also connected to a web server 24 via a second wireless link 26.

The mobile phone 12 comprises a display screen 28, associated with a displaying means, not shown, for displaying an image on the screen, and a web browser 30.

The mobile phone 12 includes a first buffer memory 32 connected as output of a web browser 30, a conversion means 34 for converting a file stored in the first buffer memory from a first format to a second format, the conversion means 34 being connected as output of the first buffer memory, and a second buffer memory 36 connected as output of the conversion means.

The mobile phone 12 also includes a radio transmitter-receiver 38 and a radio antenna 39.

The mobile phone 12 includes an information processing unit formed, for example, by a data processor associated with a memory, not shown. The processing unit is also called a computer. The memory includes the first and second buffer memories 32, 36 and is adapted to store different software. The streaming server 18, the control device 20, the downloading means 28 and the conversion means 34 respectively include streaming server software, control software, software for web browsing and for downloading data from the web server, and software for converting the file from the first format to the second format.

The remote client equipment 14 includes the client device 22, as well as a video data display screen 40 from the client device 22 and the audio data reproduction speakers 42 from the client device.

The radio link 16 is in compliance with standard IEEE 802.11, also called Wi-Fi™ standard, or standard IEEE 802.15, also called Bluetooth® standard.

The streaming server 18 is connected to the client device 22 of the remote client equipment via the transmitter-receiver 38 and the radio link 16. The streaming server 18, the control device 20 and the client device 22 are adapted to communicate via a hypertext transfer protocol, such as the HTTP protocol (HyperText Transfer Protocol).

The streaming server 18 is adapted to receive, from the client device 22 of the client equipment, a data streaming request, and to transmit in response data to said client device 22 according to the predetermined network protocol.

According to the invention, the streaming server 18 includes a control means 44 for controlling the conversion means, the streaming server 18 being adapted to send the converted file to the remote client equipment 14 via the transmitter-receiver 38.

The streaming server 18 also includes an activation means 46 for activating the web browser 30 to download a file from a web server. The streaming server 18 is adapted to activate the downloading of the file from the web server 24, command the conversion of the downloaded file, then send the downloaded and converted file to the remote client equipment 14 via the transmitter-receiver 38.

The web server 24 includes an information processing unit formed, for example, by a data processor 48 associated with a memory 50. The memory is adapted to store communication software with the downloading means 30 of the mobile phone.

The web browser 30 is connected to the transmitter-receiver 38, and includes a downloading means 52 for downloading a file from any web server, associated with a buffer downloading memory 54. The buffer downloading memory 54 is connected as an input of the first buffer memory 32. The downloading means 52 is adapted to download, block by block, the data file in the first buffer memory 32, the file including a plurality of data blocks. Alternatively, the downloading means 52 is independent of the web browser 30.

Each file in the first buffer memory 32, downloaded by the downloading means 52 or previously saved, is in a first format, and the client device 22 of the remote client equipment is compatible with a second format. The first and second formats have image or audio and/or video attributes. Each file includes a plurality of data packets. A first data packet size is associated with the first format of a file, a second data packet size is associated with the second format.

When the file is an image, the attributes are, for example, the dimensions of the image and the codec used. When the file is an audio file, the attributes are, for example, the audio bitrate, the sampling frequency, the number of channels (mono, stereo, 5.1, 7.1) and the codec used. When the file is a video file, the attributes are, for example, the dimensions of the image, the codec used, the number of images per second, also called frame rate, and the bitrate.

The conversion means 34 is adapted to convert each downloaded or previously saved file from the first format to the second format, then store the converted file in the second buffer memory 36. The conversion means 34 is adapted to convert the data file, data packet by data packet.

The conversion means 34 comprises a decryption means 56, adapted to decrypt the downloaded or previously saved file, when the first format corresponds to encrypted data.

The conversion means 34 comprises an audio and/or video transcoding means 58, adapted to transcode the downloaded or previously saved, possibly decrypted, file when the audio and/or video attributes in the second format are different from those in the first format.

The conversion means 34 comprises an encryption means 60, adapted to encrypt the downloaded or previously saved file, possibly decrypted and/or transcoded, when the second format corresponds to encrypted data.

The wireless transmitter-receiver 38 includes a transmission-reception means 62 for transmitting and receiving wireless signals and a transmission-reception buffer memory 64. The transmission-reception means 62 is connected to the radio antenna 39, and the transmission-reception buffer memory 64 is connected between the second buffer memory 36 and the transmission-reception means 62.

According to the invention, the control means 44 is adapted to send the conversion means 34 a control signal for controlling the conversion of a respective data packet of the file.

According to another aspect of the invention, the control means 44 is adapted to send the control signals to the conversion means 34, even if all of the blocks of the file are not downloaded when the file to be converted is a file downloaded from the web server 24.

According to another aspect of the invention, the streaming server 18 is adapted to send the remote client equipment 14 at least one data packet converted and stored in the second buffer memory 36, even if all of the data packets of the file are not converted. The streaming server 18 is, for example, adapted to simultaneously send a plurality of converted data packets to the remote client equipment.

The file is, for example, transmitted in pieces from the streaming server 18 to the remote client equipment 14, the size of each piece being set by the remote client equipment 14. The number of data packets simultaneously transmitted, denoted Nt, is then determined so that the total size of the Nt data packets is greater than or equal to the size of the piece. If the total size of the Nt data packets is larger than the size of the piece, then the last data packet is cut into two parts, the first part being sent in the current piece, and the second part being sent in the following piece.

The activation means 46 is adapted to activate the downloading of the data file from the web server 24, when the streaming request transmitted by the client device 22 contains a web address, also known as URL (Uniform Resource Locator), corresponding to the web server 24.

The audio and/or video transcoding means 58 includes a decoding means, also called decompression means, a means for changing audio and/or video attributes, and an encoding means, not shown.

The operation of the local transmission network 10 according to the invention will be explained below using FIGS. 2 to 5.

Figure 2:
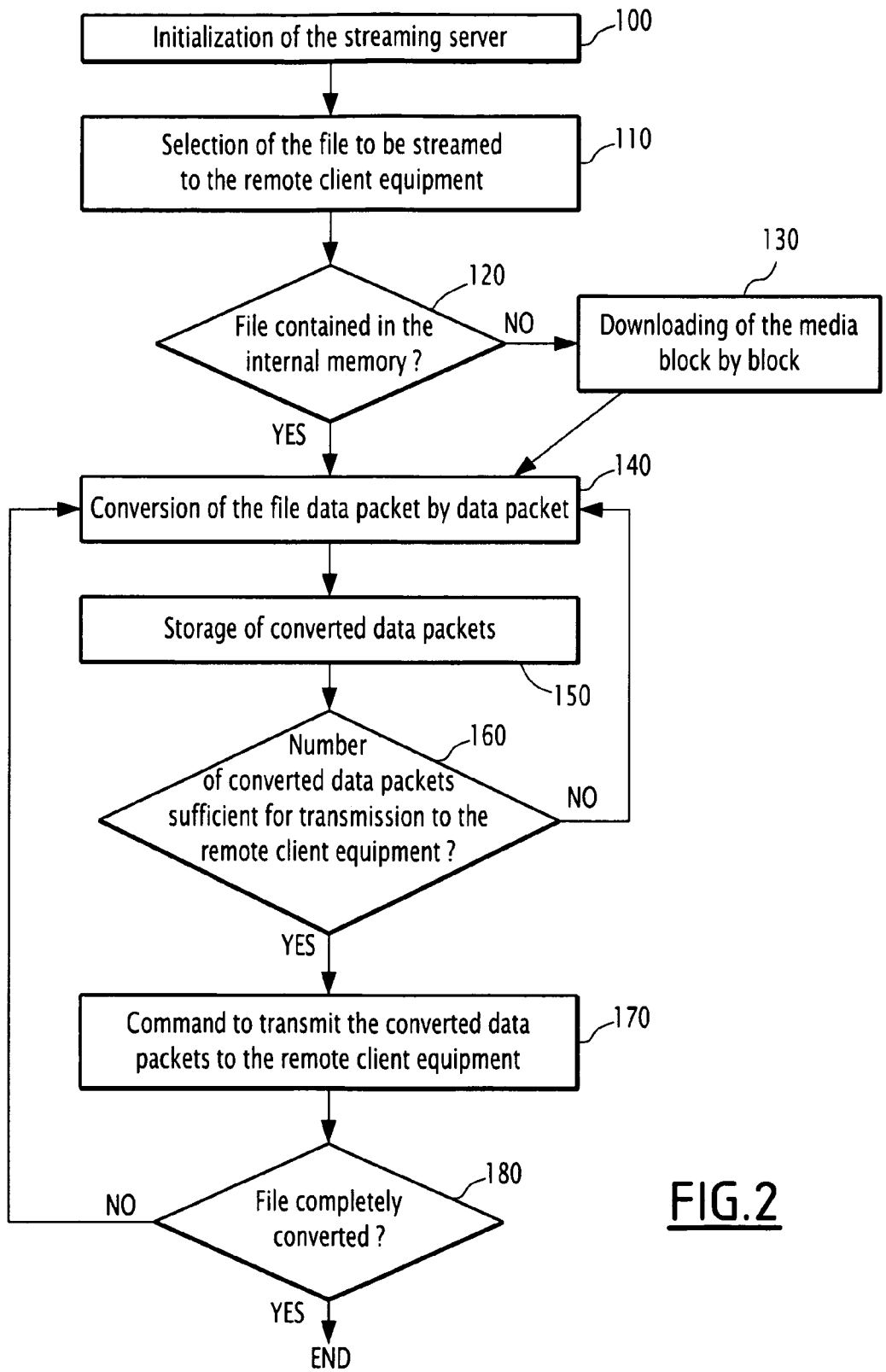
FIG. 2 is a flowchart of a method implemented by the mobile phone of FIG. 1.

FIG. 2 illustrates a method for streaming a file from the server 18 to the remote client equipment 14.

Figure 3:
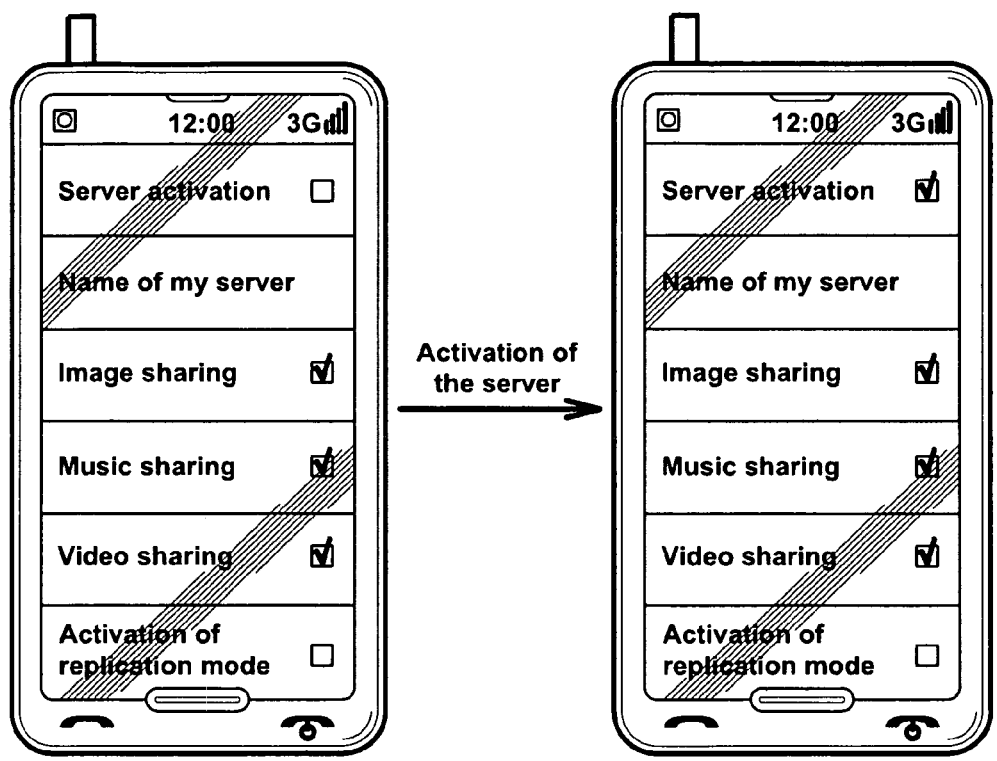
FIG. 3 is a diagrammatic illustration of the man-machine interface of the mobile phone during two successive phases of a step for initializing a server of the mobile phone.

During the initial step 100, the user starts by authorizing the sharing of any type of file from the phone 12, such as an image, a music, or a video, by checking the respective "Image sharing," "Music sharing," "Video sharing" boxes, as shown in FIG. 3. The user then activates the streaming server 18 by checking the "Activate server" box.

At the end of this initial step, the streaming server 18 of the phone is ready to transmit, via its activation means 46, activation signals to the downloading means 52, upon receipt by the remote client equipment 14 of a streaming request with a URL corresponding to the web server 24.

Figure 4:
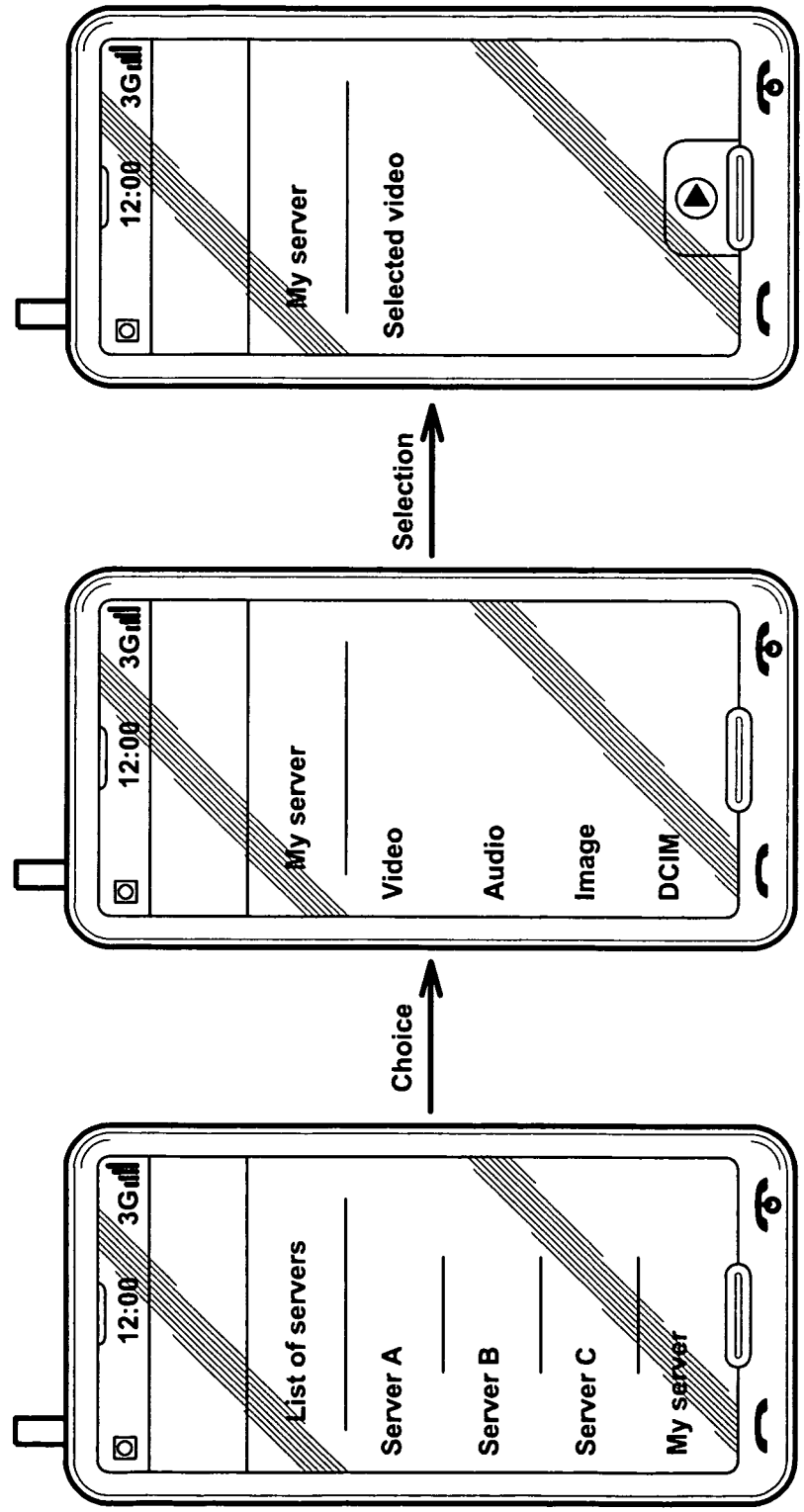
FIG. 4 is a diagrammatic illustration of the man-machine interface of the mobile phone during successive phases of a step for selecting a video to be streamed, and FIGS. 5 to 7 diagrammatically illustrate the conversion of different data packets of a file before they are streamed by the server for different pairs of values of a first data packet size associated with a first format of a file, downloaded or stored in an internal memory of the phone and intended to be transmitted to remote client equipment on the local network, and a second data packet size associated with a second format corresponding to the restoration format by the remote client equipment of the file received from the mobile phone.

After having activated the streaming server 18, the user views, in step 110 via the control device 20, the list of available streaming servers, and choses, for example, the server 18 previously activated, called "My server" in the embodiment of FIG. 4. When the user has selected the server 18, the control device 20 sends a request to the server 18 so as to have a list of media directories that are likely to be streamed, and the server responds by communicating the list of directories. In the example of FIG. 4, the user then chooses the "Video" directory, which contains a file called "Selected video," the list of videos contained in the "Video" directory being obtained by request from the control device 20 to the streaming server 18. In the example of FIG. 4, the "Selected video" file is already saved in the first buffer memory 32.

By selecting the "Selected video" video file, the user authorizes the beginning of the streaming from the remote client equipment 14. The control device 20 then sends a request to the streaming server 18 so as to obtain a web address, also known as a URL (Uniform Resource Locator) associated with said "Selected Video" video file.

In response, the streaming server 18 returns a list of URLs, the first URL corresponding to a default format, and the following URLs corresponding to converted data formats. As a complement to the list of URLs, the streaming server 18 also returns a list of proposed formats, each format being associated with a URL. The control device 20 also sends a request to the client device 22, so as to obtain the list of formats supported by the client device 22.

The control device 20 then compares the list of different formats proposed by the streaming server 18 with the list of formats supported by the client device 22, and selects a format shared by those two lists. In other words, the selected shared format is the second format previously described.

In order to effectively control the beginning of the streaming, the user initiates reading of the file via the control device 20, and the control device 20 then sends the client device 22 the URL from the list sent by the streaming server 18 and corresponding to the selected shared format.

The client device 22 sends the streaming server 18 a request containing the URL previously received from the control device 20. During step 120, the streaming server 18 then determines whether the file corresponding to the received URL is contained in the internal memory or in the memory 50 of the web server.

When the file corresponding to the received URL is contained in the memory of the web server 24, the streaming server 18 sends, during step 130, via the activation means 46, an activation signal for the downloading means 52 to download the file from the web server 24.

The downloading means 52 then downloads, block by block, the file in the first buffer memory 32. After it is activated by the streaming server 18, the downloading means 52 performs the downloading independently of the streaming means 18 and a conversion means 34, and storing, as it goes along, each downloaded block in the first buffer memory 32.

After activating the downloading (step 130), or directly after step 120 if no downloading is necessary, the control means 46 sends, during step 140, control signals to the conversion means 34, and the conversion means 34 then converts, data packet by data packet, the file from the first format to the second format, then saves the converted data packet in the second buffer memory 36, during step 150.

In the case where the file is downloaded from the web server 24, the control means 46 sends the control signals to the conversion means 34 even if all of the blocks of the file are not downloaded.

When the first format corresponds to encrypted data, the conversion of a respective data packet of the file includes the decryption of said respective data packet by the decryption means 56.

When the audio and/or video attributes of the second format are different from those of the first format, the conversion of a respective data packet of the file includes the audio and/or video transcoding of said respective data packet by the transcoding means 58. Said respective data packet may have been decrypted beforehand by the decryption means 56.

When the second format corresponds to encrypted data, the conversion of a respective data packet of the file includes the encryption of said respective data packet by the encryption means 60. Said respective data packet may have been decrypted beforehand by the decryption means and/or transcoded beforehand by the transcoding means 58.

After storage of the transformed data packet (step 150), the streaming server 18 determines, in step 160, whether the number of converted data packets is sufficient for transmission of the file to the remote client equipment 14. In other words, the streaming server determines whether the number of converted data packets is greater than the number Nt corresponding to the number of data packets transmitted simultaneously by the streaming server 18 to the client device 22.

If the number of converted data packets is sufficient, then the streaming server 18 commands the transmitter-receiver 38 to transmit the file to the remote client equipment 14, in step 170. The converted data packets are then transferred from the second buffer memory 36 to the transmission-reception buffer memory 64, for their autonomous transmission by the transmission means 62 of the transmitter-receiver.

If not, the streaming server 18 reiterates the method from the conversion step 140 as many times as necessary.

After transmitting the converted data packets of the video file, the streaming server 18 lastly verifies, during step 180, that all of the data packets of the file have been converted, and in the contrary case returns to the conversion step 140.

Figure 5:
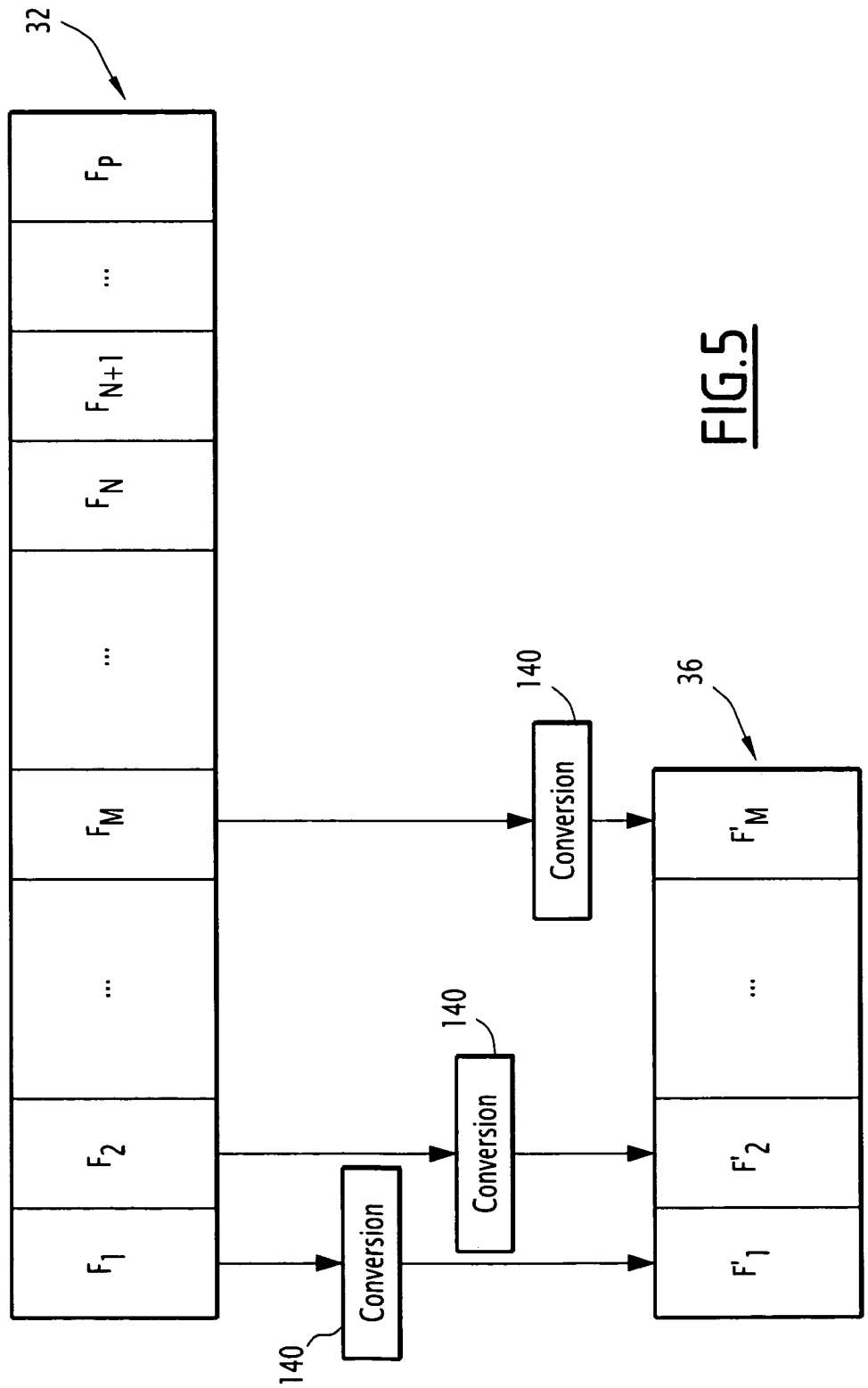
Figure 6:
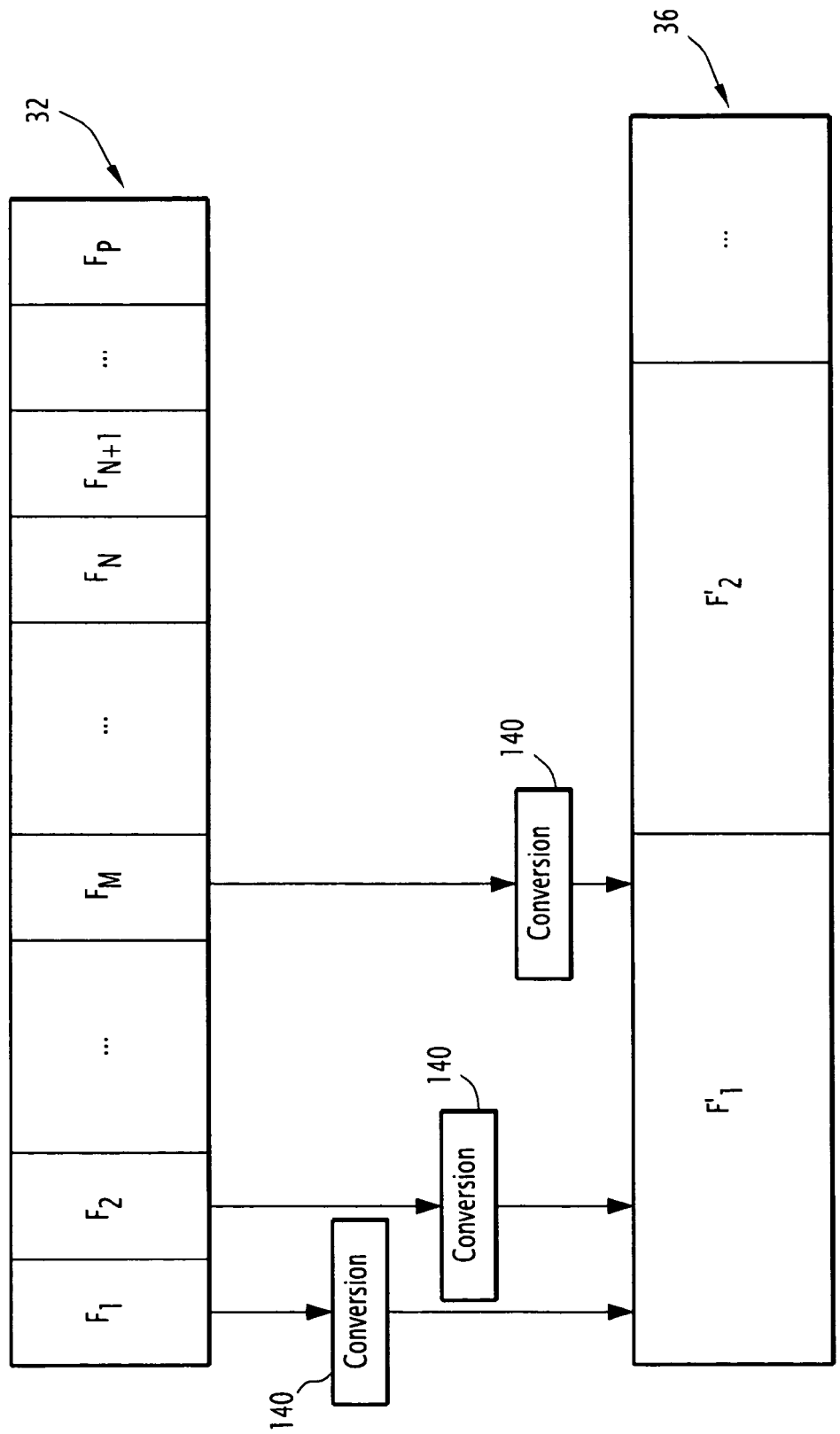
Figure 7:
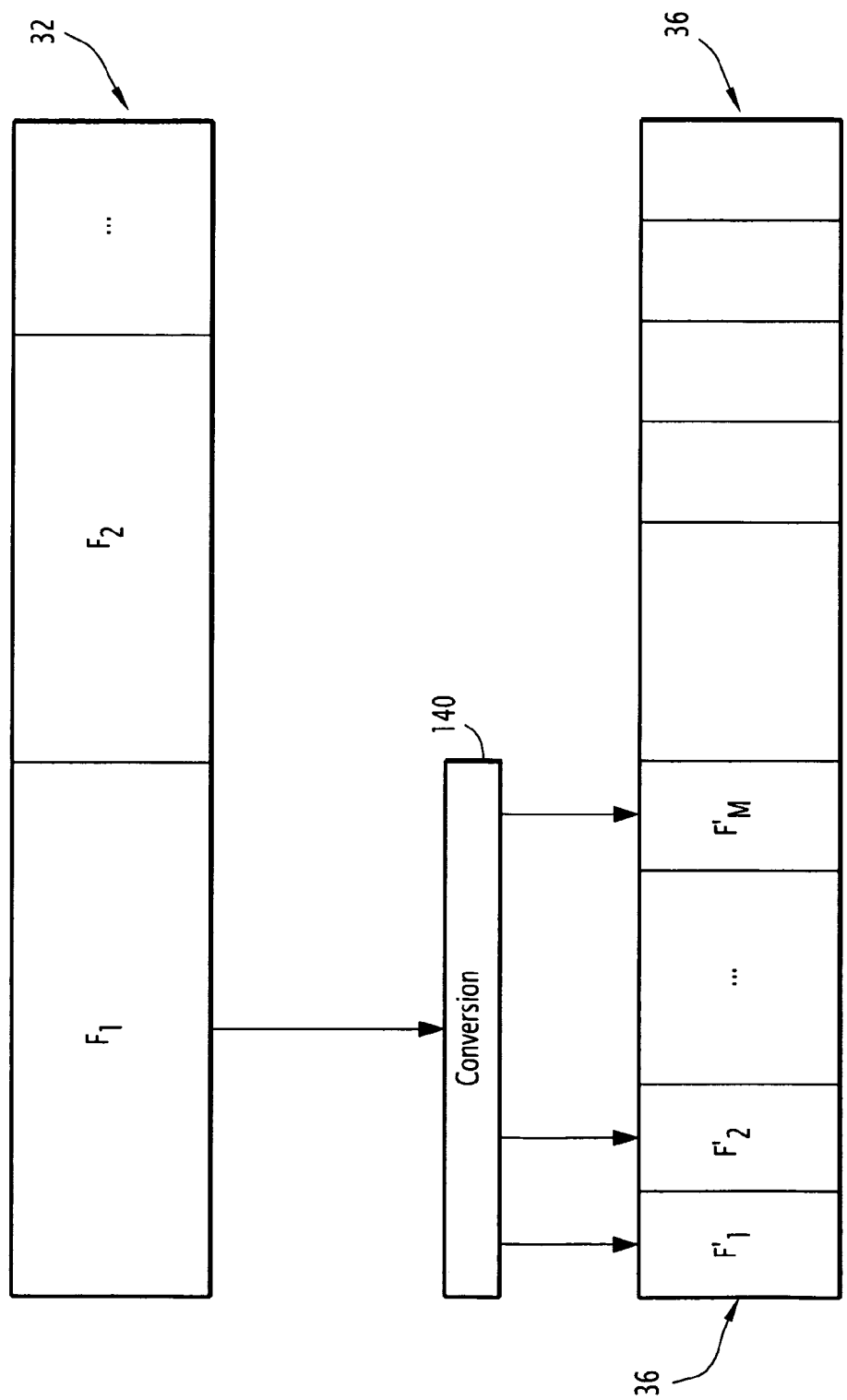

FIGS. 5 to 7 diagrammatically illustrate the conversion of different data packets of a file before they are streamed by the server 18 for different pairs of values of the first data packet size in the first format of a file and the second data packet size in the second format.

In the embodiment of FIG. 5, the first data packet size is equal to the second data packet size, and a cycle comprising steps 140 to 160 has been done M times successively, with a conversion step 140 in each cycle. FIG. 5 also shows the storage in the first buffer memory 32 of the data packets F1 to FP of the file before conversion, as well as storage in the second buffer memory 36 of the M converted packets F'1 to F'M ready to be streamed to the remote client equipment 14.

In the embodiment of FIG. 6, the first data packet size is smaller than the second data packet size, and a cycle comprising steps 140 to 160 has been done M times successively, with a conversion step 140 in each cycle. The second data packet size is M times greater than the first data packet size, the converted data packet F'1 corresponding to the M data packets F1 to FM of the file before conversion. FIG. 6 also shows the storage in the first buffer memory 32 of the data packets F1 to FP of the file before conversion, as well as the storage in the second buffer memory 36 of the converted packets F'1, F'2 ready to be streamed.

In the embodiment of FIG. 7, the first data packet size is larger than the second data packet size, and the cycle comprising steps 140 to 160 is done once per data packet of the file before conversion. The first data packet size is M times larger than the second data packet size, the M converted data packets F'1 to F'M corresponding to data packet F1 of the file before conversion. The conversion step then includes a duplication step, the data packet F'1 being duplicated M−1 times to obtain the data packets F'2 to F'M. The M converted data packets F'1 to F'M are identical. FIG. 7 also shows the storage in the first buffer memory 32 of the packets F1, F2 of the file before conversion, as well as the storage in the second buffer memory 36 of the converted data packets to F'M ready to be streamed.

The streaming server of the mobile phone 12 according to the invention thus makes it possible to stream a file whereof the format is not supported by the remote client equipment 14, without having first transformed the file into the supported format. In fact, the streaming server includes the control means 44 for controlling the conversion means 34, and the conversion of the file is then done transparently for the user.

Furthermore, the streaming server transmits the file, converted data packet by converted data packet, via the transmitter-receiver 38, even if all of the data packets of the file are not converted. This makes it possible to reduce the waiting time for the user, by sending converted data packets as early as possible to the client equipment 14, without waiting for all of the file to have been converted.

When the file is not stored in an internal memory 32 of the phone, but is downloaded from the web server 24 via the web browser 30, the control means 44 send the control signals to the conversion means 34 without waiting for all of the file to have been downloaded. This also makes it possible to reduce the waiting time for the user.

One can thus see that the invention makes it possible to propose a mobile phone comprising a streaming server and a conversion means for converting a file from a first format to a second format, making it possible to facilitate the streaming of a file whereof the format is not supported by the remote client equipment.

What is claimed is:
1. A mobile phone comprising:
   a first buffer memory for storing a data file, the data file being in a first format and including a plurality of data packets;

a converter for converting the file stored in the first buffer memory from the first format into a second format, the converter being connected to an output of the first buffer memory;

a second buffer memory connected to an output of the converter and configured to store the file converted in the second format; and a streaming server for streaming data to a remote client equipment according to a predetermined network protocol, the streaming server being configured to be connected to the remote client equipment via a data link and to receive a data streaming request from the remote client equipment;

the streaming server including a controller for controlling the converter, the controller being configured to send the converter a control signal for controlling the conversion of a respective data packet of the file, wherein the streaming server is configured to send the remote client equipment at least one data packet converted and stored in the second buffer memory, even if all of the data packets of the file are not converted, wherein the streaming server is configured to simultaneously send a plurality of converted data packets to the remote client equipment, wherein the mobile phone also comprises a downloader for downloading data from a web server, the file including a plurality of data blocks, wherein the downloader is configured to download, block by block, the data file in the first buffer memory, and wherein the controller is configured to send the control signals to the converter, even if all of the blocks of the file are not downloaded.

2. The mobile phone as recited in claim 1 wherein the converter includes an audio and/or video transcoder, the first and second formats including audio and/or video attributes, and the audio and/or video attributes of the second format being different from those of the first format.

3. The mobile phone as recited in claim 1 wherein the converter comprises a decrypter, the first format corresponding to the data in encrypted format.

4. The mobile phone as recited in claim 1 wherein the converter comprises an encrypter, the second format corresponding to the data in encrypted format.

5. A local data communication network comprising the mobile phone as recited in claim 1 and the remote client equipment connected to the mobile phone via the data link, the mobile phone and the remote client equipment being adapted to communicate using the predetermined network protocol.

6. A method implemented by a mobile phone comprising a first buffer memory, a converter for converting data from a first format to a second format, the converter being connected to an output of the first buffer memory, a second buffer memory connected to an output of the converter, and a streaming server configured to be connected to remote client equipment via a data link and configured to receive a data streaming request from the remote client equipment, the streaming server including a controller for controlling the converter, the controller being configured to send the converter a control signal for controlling the conversion of a respective data packet of the file, the method comprising:

storing a data file in the first buffer memory, the data file being in a first format and including a plurality of data packets;

transmitting, by the streaming server, a control signal to the converter;

converting by the converter of a respective packet of the file, upon receipt of the control signal; and storing the respective converted data packet in the second buffer memory, wherein the streaming server sends the remote client equipment at least one data packet converted and stored in the second buffer memory, even if all of the data packets of the file are not converted, wherein the streaming server simultaneously sends a plurality of converted data packets to the remote client equipment, wherein the mobile phone also comprises a downloader downloading data from a web server, the file including a plurality of data blocks, wherein the downloader downloads, block by block, the data file in the first buffer memory, and wherein the controller sends the control signals to the converter, even if all of the blocks of the file are not downloaded.

7. Non-transitory computer readable media having stored thereon a computer program product including instructions that, when implemented by a computer incorporated into a mobile phone, implements the method as recited in claim 6.

* * * * *